United States Patent
Mori

[15] 3,695,440
[45] Oct. 3, 1972

[54] FILTER BELT WITH MEANS FORMING THEREWITH PLURAL PRESSURE FILTER CHAMBERS

[72] Inventor: Takao Mori, Nara, Japan

[73] Assignee: Inouye Kinzoku Kogyo Kabushiki Kaisha, Osaka, Japan

[22] Filed: Aug. 26, 1970

[21] Appl. No.: 67,026

[30] Foreign Application Priority Data

Aug. 30, 1969 Japan ..................... 44/68824

[52] U.S. Cl. .................. 210/225, 210/228, 210/231
[51] Int. Cl. .............................................. B01d 25/12
[58] Field of Search .......... 210/66, 67, 136, 225, 228, 210/231

[56] References Cited

UNITED STATES PATENTS

| | | |
|---|---|---|
| 3,342,123 | 9/1967 | Ermakov et al ........ 210/225 X |
| 3,583,566 | 6/1971 | Meshengisser et al ..... 210/225 |
| 3,390,772 | 7/1968 | Juhasz ................... 210/225 X |
| 1,342,829 | 6/1920 | Shriver ..................... 210/136 |

Primary Examiner—Samih N. Zaharna
Attorney—Robert E. Burns and Emmanuel J. Lobato

[57] ABSTRACT

A method for filtration of raw liquid comprising the steps of supplying raw liquid under pressure into a filtration chamber formed between upper and lower filter cloths arranged in opposition to produce two filtrate flows passing through said upper and lower filter cloths in upper and lower directions, respectively, and then discharging the filtrate with cakes remained in said filtration chamber and the apparatus for carrying out the same method comprising a filter frame provided at its one side with a raw liquid supply opening, two filter plates each having a filtrate discharge hole and including a partition plate provided with a filtrate passage hole communicated with said filtrate discharge hole, said filter frame being interposed between said filter plates to form a filtration chamber, and a filter cloth arranged between the filter frame and the filter plates.

5 Claims, 6 Drawing Figures

FILTER BELT WITH MEANS FORMING THEREWITH PLURAL PRESSURE FILTER CHAMBERS

This invention relates to a filter apparatus a horizontal plate type filter press which is excellent in filtration efficiency and can remove cakes remained as residue in an easy manner.

A conventional horizontal filter plate type filter press heretofore proposed comprises a horizontal filter plate adapted to effect filtration of raw liquid. In such conventional filter press use has commonly been made of an endless filter cloth adapted to be intermittently moved. When the filter cloth stops at its filtration position filtration of the raw liquid is carried out and subsequent movement thereof causes to shift cakes adhered to and laminated on the filter cloth towards both sides thereof thus removing the cakes.

The above mentioned conventional filter press is provided at its one side with a filter cloth driving mechanism, a driving motor and a power transmission mechanism, all of there mechanisms being arranged across a cake removing mechanism and hence has the disadvantage that it is not only complex in construction but also troublesome in handling and maintenance.

In order to remove the cakes from one side only of the filter cloth instead of removing them from both sides thereof, another type of filter press has been proposed. However, such type of filter press has its own disadvantage that its filtration efficiency becomes considerably lower.

A further type of filter press adapted to carry out filtration of the raw liquid with the aid of a vertical filter plate has also been proposed. Such type of filter press has not been used in case of filtering cakes owing to the fact that the cakes become laminated one upon the other at the lower part of the filter press thereby giving hindrance to the operation thereof.

Moreover, it has been well known to provide a filter apparatus comprising a horizontal filter plates for forming a filter chamber, and a compressive bag such as a rubber bag etc. mounted in the filter chamber and adapted to make use of expansion pressure thereof for compressing cakes remained in the filter chamber and containing more than a given amount of raw liquid, thereby separating the liquid from the cakes and hence carrying out filtration of the raw liquid. Such conventional filter apparatus has the disadvantage that the compressive bag directly makes contact with the filter plates so that there is risk of the compressive bag being broken by sharp edges of foreign matters etc. present in the cakes with the result that the pressive liquid flows into the cakes and hence a sufficient filtration under pressure could not be carried out and that troublesome laborious work is required in order to amend that broken compressive bag.

It is, therefore, an object of this invention to provide a horizontal filter plate type filter press which is high in filtration efficiency and can remove cakes in an easy manner.

A further object of the invention is to provide an improved filter press capable of carrying out filtration of raw liquid in a highly efficient manner.

A still further object of the invention is to provide a novel filter press having such excellent durability that a highly efficient filtration can be kept for a considerably long duration.

These and other desirable objects are attained, according to this invention, by a filter press in which a filter cloth is arranged on the upper and lower parts of a filtration chamber into which raw liquid to be filtered is supplied to divide the filtrate flow into two streams flowing towards upper and lower directions. According to another important feature of the invention, provision is made of a compressive bag for further compressing cakes adhered to the inner surface of each of the upper and lower filter clothes. According to further feature of the invention, in case of carrying out filtration with the aid of a compressive bag use is made of a body for reinforcing the compressive bag. These features of the invention are described in greater detail in the following description of certain embodiments which are illustrations only of the invention, and other embodiments will occur to those skilled in the art without departing from the scope of the invention.

This description refers to the accompanying drawings, in which.

Figure 1:
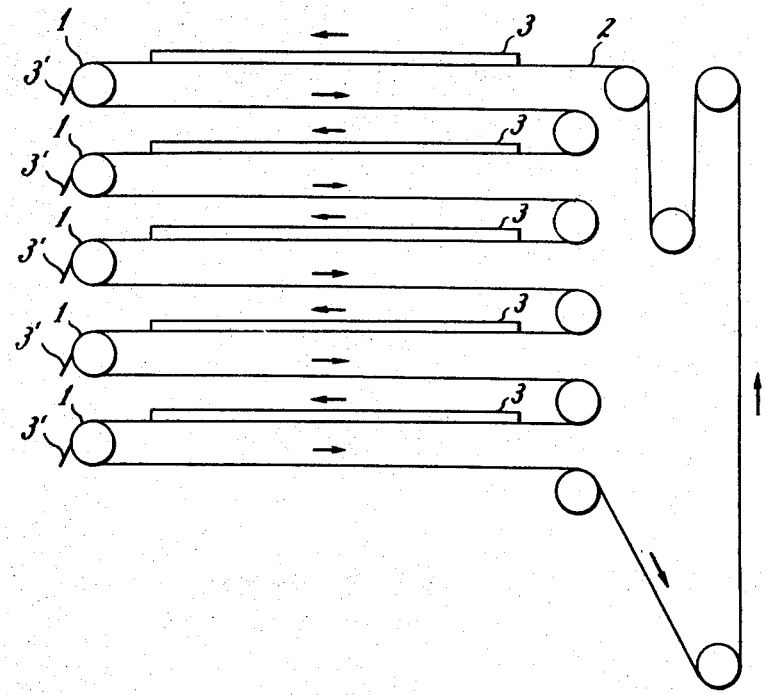
FIG. 1 is a diagrammatic cross-section through an endless filter cloth driven by an automatic filter press according to the invention.
Figure 3:
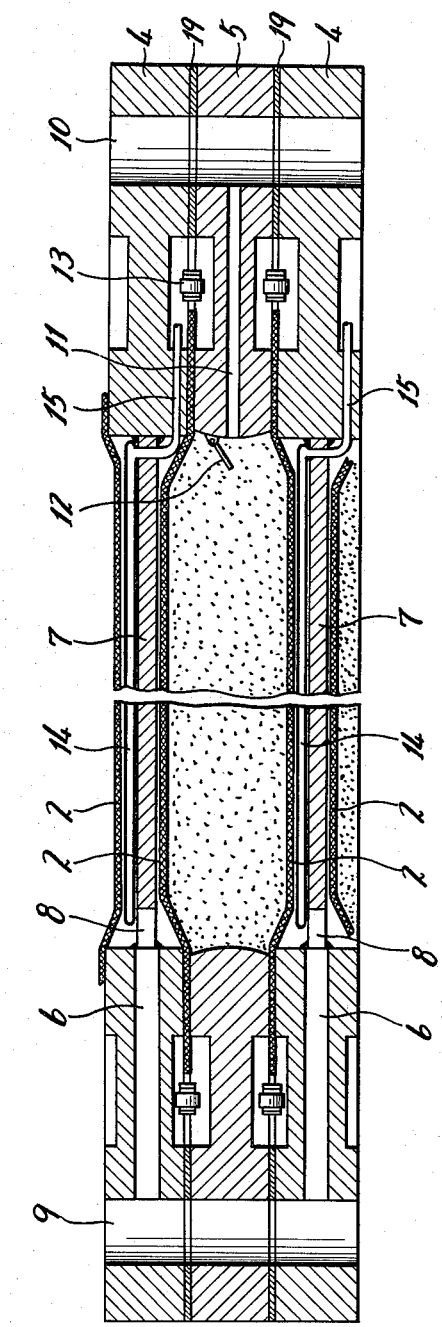
FIG. 3 is a vertical section in detail and partly broken away through a filtration mechanism constituting an essential part of the filter press according to the invention.
Figure 4:
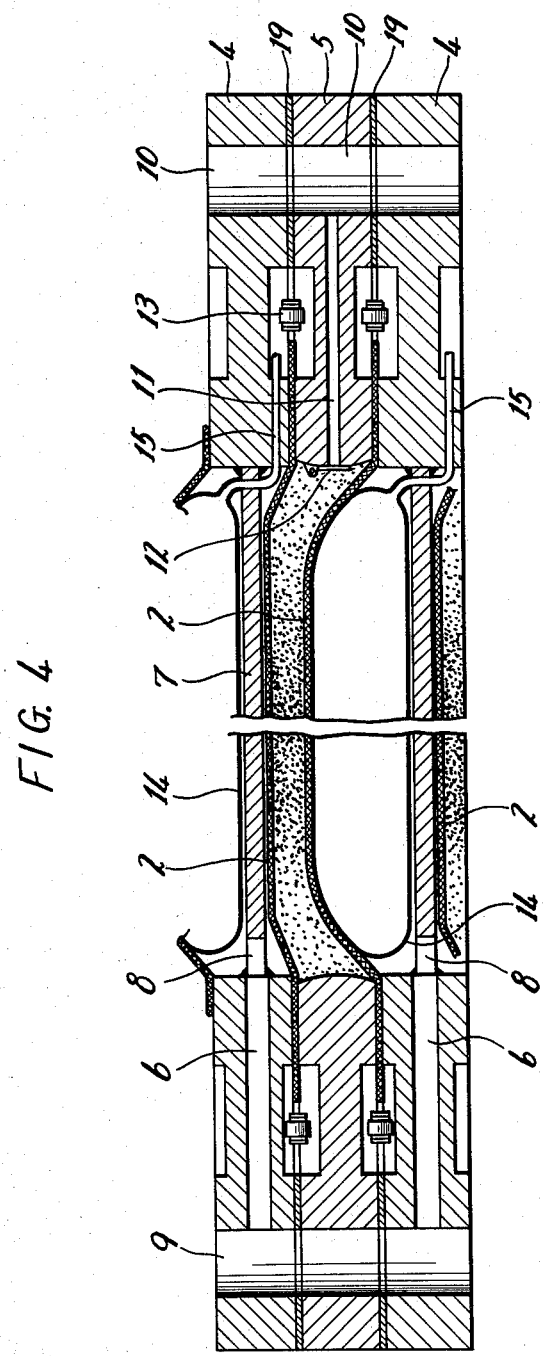
FIG. 4 is a vertical section similar to FIG. 3 showing the filtration mechanism in its compressed state.

In FIGS. 3 and 4 a filtration mechanism according to the invention comprises two upper and lower filter plates 4, 4 and one intermediate filter frame 5 disposed alternately one upon the other with packings 19 inserted therebetween. The filter plate 4 is provided at its front side (left side in FIGS. 3 and 4) with a filtrate discharge hole 6 having a desired diameter and communicated with gaps formed along the top and bottom surfaces of a partition plate 7 through a filtrate passage hole 8 formed by cutting off the front edge of the partition plate 7. The filtrate discharge hole 6 is connected to a liquid discharge opening 9 (FIG. 5) adapted to discharge the filtrate to the exterior of the filtration mechanism. The filter plate 4 is provided at its rear side (right side in FIGS. 3 and 4) with a liquid supply opening 10 having a desired diameter. The filter frame 5 inserted between the upper and lower filter plates 4, 4 is provided at its rear side (right side in FIGS. 3 and 4) with a liquid supply opening 10 and is further provided with a liquid supply hole 11 communicated with the liquid supply opening 10. The liquid supply hole 11 is provided at its free open end with a valve 12 adapted to be opened and closed in response to the liquid pressure subjected to it. 2 designates two upper and lower filter clothes whose selvages are clamped by clips 13 secured to a guide chain etc. (not shown). The filter cloth 2 is made endless and is guided by guide rolls 1 as shown in FIG. 1 such that the uppermost filter cloth 2 together with cakes 3 produced thereon move through the filter mechanism in a direction from its right side to its left side and then pass around the guide roll 1 and come to a lower passage and move in the opposite direction from its left side to its right side in alternate succession as shown by arrows in FIG. 1.

Figure 5:
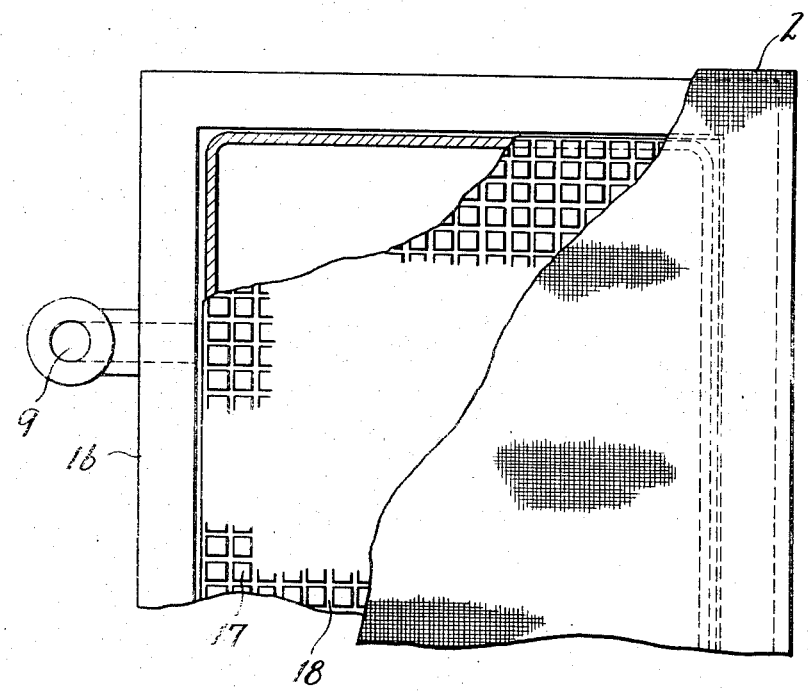
FIG. 5 is a fragmentary plan view showing the filter plate shown in FIG. 2 and a reinforcing body for a compressive bag.
Figure 6:
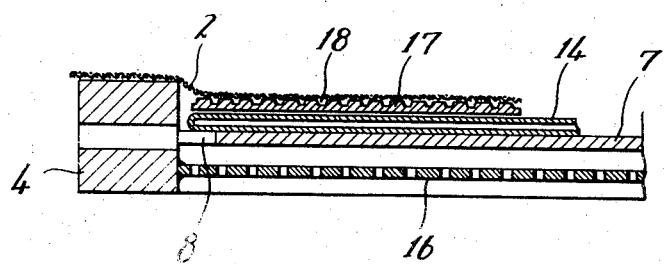
FIG. 6 is a vertical section through the filter plate shown in FIG. 2 in enlarged scale.

Between the partition plate 7 and the filter cloth 2 is arranged a compressive bag 14 such as a rubber bag into which is supplied a pressure fluid through a tube 15 from the exterior of the filtration mechanism. The pressure fluid filled in the compressive bag 14 is also adapted to be discharged out of the compressive bag 14 through the tube 15 to the exterior of the filter mechanism. Between the compressive bag 14 and the filter cloth 2 is arranged a sheet shaped flexible reinforcing body 17 made of rubber or synthetic resin etc. as shown in FIGS. 5 and 6. The flexible reinforcing body 17 is provided at that surface which is adjacent to the filter cloth 2 with a number of grid shaped grooves 18 for guiding and discharging the filtrate. The rear surface of the flexible reinforcing body 17 which is adjacent to the compressive bag 14 is made flat. The flexible reinforcing body 17 is made square in shape and covers an area which is a little smaller than that of a filter chamber formed by the filter plates 4 and the filter frame 5. The filtrate discharge grooves 18 are not limited in shape to the grid-shape as shown in FIG. 5, but may take any configuration in which the grooves 18 cross in communication each other and then connected to the periphery of the flexible reinforcing body 17.

Figure 2:
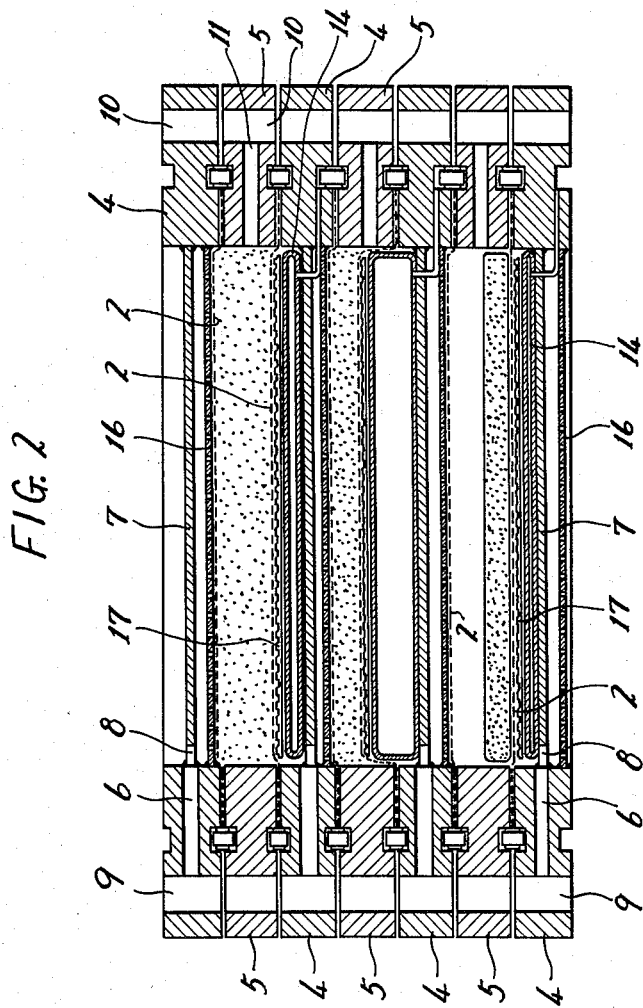
FIG. 2 is a vertical section through filter frames and plates laminated one upon the other to construct a filter press according to the invention.

A number of the filtration mechanisms constructed as described above are disposed one upon the other with one filter plate 4 common to the two adjacent filtration mechanisms as shown in FIG. 2 to form an assembly. The assembly is compressed by any suitable fluid press (not shown) to tight together to complete a filter press.

The operation of the filter press thus constructed is as follows.

Raw liquid is supplied under pressure to one end of the liquid supply opening 10 with the aid of a supply pump (not shown). The raw liquid is forcedly introduced from the liquid supply opening 10 through each of the raw liquid supply holes 11 into the filtration chamber formed between the upper and lower filter cloths 2, 2 arranged on the top and bottom surfaces of the filter frame 5. The raw liquid is thus filtrated under pressure by means of the upper and lower filter cloths 2, 2. A portion of the filtrate passes through the upper filter cloth 2 and then through the gaps formed along the partition plate 7, the filtrate passage hole 8, the filtrate discharge hole 6 to the discharge opening 9. The rest of the filtrate passes through the lower filter cloth 2 and then is guided by the flexible reinforcing body 17 and its grid-shaped grooves 18 and passes through the partition plate 7, the filtrate passage hole 8, the filtrate discharge hole 6 to the discharge opening 9. The filtration under pressure is effected by the upper and lower filter cloths 2, 2 to produce cakes in the filtration chamber. When the increased amount of the cakes causes to decrease the filtration efficiency the operation of the above mentioned raw liquid supply pump is stopped and then the liquid supply opening 10 is closed by a suitable means. Then a pressure fluid such as compressed air compressed by means of a compressor (not shown) is supplied through the tube 15 into the compressive bag 14 which is then expanded to gradually compress the cakes with the result that the raw liquid remained in the cake is supplied again as the filtrate through the above mentioned passage to the discharge opening 9. The cakes without containing substantially no liquid is deformed into a thin plate-shaped configuration. Then, the pressure subjected to the fluid is released and the fluid is discharged from the compressive bag 14 which returns to its original flat shape. The cakes owing to gravity thereof remain on the lower filter cloth 2 and are deposited thereon.

During the compressive filtration operation the presence of the flexible reinforcing plate 17 located immediately beneath the filter cloth 2 is capable of preventing the compressive bag 14 from being damaged by the sharp edged foreign matter eventually mingled in the cake. Moreover, the filtrate discharge grooves 18 formed on one side surface of the flexible reinforcing body 17 ensure a smooth guide for flow of the filtrate along the partition plate 7, through the filtrate passage hole 8, towards the filtrate discharge hole 6. When the compressive bag 14 is expanded to effect the compressive filtration the flexible reinforcing bag 17 permits not only the filtrate to be smoothly flown but also the compressive bag 14 to be sufficiently protected. The filter press according to the invention further provides the important advantage that the filter frames 5 can be opened after the compressive filtration has been completed to remove the cake from the filtration chamber, and that the filtration under pressure-compressive filtration-residue discharge can be repeated in the order as mentioned.

During the above mentioned steps of the filtration under pressure and of the compressive filtration with the aid of the compressive bag 14 the valve 12 closes the liquid supply hole 11 so that the raw liquid and cakes 3 are prevented from becoming counter flown into the liquid supply opening 10. The above mentioned compressive filtration effect can be attained by inserting the compressive bag 14 between the partition plate 7 and the filter cloth 2.

The filter cloth 2 is removed after the filtration of the raw liquid has been completed and then the filter frames 5 are opened to remove the cakes 3 (FIG. 1) laminated on the filter cloth 2 during the movement thereof in one direction with the aid of a cake scraper 3' shown in FIG. 1, thereby collecting the cakes 3.

The above mentioned series of steps may be carried out manually. Alternatively, the amount of the raw liquid supplied, the fluid pressure, the amount of flow of the filtrate may be detected by a conventional detecting means (not shown) to control the series of steps and the supply and stop of the raw liquid, and in association therewith the rate of compression of the compressive bag, the opening of the filter frames, the driving of the filter cloth etc. may be controlled to effect the filtration in a completely automatic manner.

The filter press constructed as above described according to the invention renders it possible in the first plate to filtrate the raw liquid by means of the filtration under pressure, secondly to separate the cakes from the filtrate with the aid of the compressive filtration in a substantially complete manner thereby improving the filtration efficiency and finally to make the cakes adhered to the inner surface of the filter cloth into an integral body thereby dehydrating under pressure and discharging the cakes in one direction. Thus, the invention provides the important advantage that the mechanism for discharging the cakes which has heretofore been complex in construction is remarkably simplified, that the discharge efficiency is improved with the rate of discharge of the cakes becomes shortened to the order of about 1/50 less than that of the conventional mechanism with the result that the filtration efficiency is remarkably improved.

Moreover, the filter press according to the invention has the advantage that the flexible reinforcing body having filtrate discharge grooves and inserted between the compressive bag and the filter cloth makes it possible during the filtration under pressure and the compressive filtration to guide the filtrate by means of the filtrate discharge grooves and hence discharge it in a highly fluid state and also to prevent the compressive bag from being damaged by the presence of the foreign matter mingled in the cakes thereby improving the filtration efficiency and ensuring a long life of the compressive bag.

What is claimed is:

1. Apparatus for filtration of raw liquid comprising at least two filter frames and at least three filter plates, said filter frames and filter plates each having central cavities and each being alternately superimposed on one another, each of said filter frames being provided at its one side with a raw liquid supply opening, each of said filter plates having a filtrate discharge passage and each having a partition member extending across the respective cavity, each of said partition members having a filtration passage opening communicatory with said filtrate discharge passage, and endless filter cloth interposed between each contiguous filter frame and filter plate, guide rollers over which said endless filter cloth is disposed to define a serpentine path of travel for said endless filter cloth in which upper and lower cloth portions are interposed between each contiguous filter frame and filter plate to extend across said cavities, whereby a plurality of filtration chambers are superimposed one over the other between said raw liquid supply openings and said filtrate discharge passages with each filtration chamber being defined by an upper and a lower cloth portion, means for supplying raw liquid under pressure through said supply openings into said filtration chambers, said upper and lower cloth portions being disposed between two partition members of two opposed filter plates, and expandable means located between said lower portion of said filter cloth and the adjacent partition member for reducing the volume of said filtration chamber to compress the filtered material in the form of cakes and deposit the latter on the upper surface of said lower cloth portion, means conducting the filtrate from the upper and lower cloth portions along separate upper and lower paths respectively for discharge through said filtrate discharge passages, means for supplying pressure fluid into said expandable means to expand the latter, means for controlling the liquid in the filtration chambers from backflowing into said supply openings when said expandable means and expanded, means for moving said filter cloth along its serpentine path, and cake scraper means located on one side of said filtration chambers for removing said cakes from the same side of said filtration chambers as said cakes travel in the same direction in being discharged from their respective lower filter cloth portions.

2. Apparatus as claimed in claim 1, which further comprises flexible reinforcing bodies each having filtrate discharge grooves, said flexible reinforcing bodies being inserted between said expandable means and the lower filter cloth portion.

3. Apparatus as claimed in claim 1, in which sheet-shaped, flexible reinforcing bodies each having filtrate discharge grooves at one side surface are further arranged each between the lower filter cloth portion and the expandable means with said filtrate discharge grooves being located adjacent to the filter cloth portion.

4. Apparatus as claimed in claim 1, wherein said expandable means is an expandable bag made of flexible material.

5. Apparatus as claimed in claim 4 wherein said expandable bag is made of rubber.

* * * * *